US006754626B2

(12) United States Patent
Epstein (10) Patent No.: US 6,754,626 B2
(45) Date of Patent: Jun. 22, 2004

(54) CREATING A HIERARCHICAL TREE OF LANGUAGE MODELS FOR A DIALOG SYSTEM BASED ON PROMPT AND DIALOG CONTEXT

(75) Inventor: Mark E. Epstein, Katonah, NY (US)

(73) Assignee: International Business Machines Corporation, Armonk, NY (US)

(*) Notice: Subject to any disclaimer, the term of this patent is extended or adjusted under 35 U.S.C. 154(b) by 486 days.

(21) Appl. No.: 09/798,655

(22) Filed: Mar. 1, 2001

(65) Prior Publication Data

US 2002/0123891 A1 Sep. 5, 2002

(51) Int. Cl.$^7$ .................. G10L 15/26; G10L 15/08; G10L 15/10; G10L 15/18
(52) U.S. Cl. ............. 704/235; 704/238; 704/236; 704/240
(58) Field of Search ................. 704/235, 238, 704/251, 257, 243, 219, 256, 9, 255

(56) References Cited

U.S. PATENT DOCUMENTS

| | | | | |
|---|---|---|---|---|
| 4,587,670 A | * | 5/1986 | Levinson et al. | 704/256 |
| 5,465,318 A | * | 11/1995 | Sejnoha | 704/243 |
| 5,694,558 A | * | 12/1997 | Sparks et al. | 704/9 |
| 5,787,394 A | * | 7/1998 | Bahl et al. | 704/238 |
| 6,061,653 A | * | 5/2000 | Fisher et al. | 704/256 |
| 6,182,039 B1 | * | 1/2001 | Rigazio et al. | 704/257 |
| 6,185,530 B1 | * | 2/2001 | Ittycheriah et al. | 704/255 |
| 6,188,976 B1 | * | 2/2001 | Ramaswamy et al. | 704/9 |
| 6,253,179 B1 | * | 6/2001 | Beigi et al. | 704/243 |
| 6,278,973 B1 | * | 8/2001 | Chung et al. | 704/257 |
| 6,292,776 B1 | * | 9/2001 | Chengalvarayan | 704/219 |
| 6,308,151 B1 | * | 10/2001 | Smith | 704/235 |
| 6,526,380 B1 | * | 2/2003 | Thelen et al. | 704/251 |

FOREIGN PATENT DOCUMENTS

| | | | | |
|---|---|---|---|---|
| DE | 019635754 A1 | * | 9/1996 | G10L/5/00 |
| EP | 0903727 | | 3/1999 | G10L/3/00 |
| JP | 2000-221991 | * | 8/2000 | G10L/15/18 |
| WO | WO 00/58945 | | 10/2000 | G10L/15/26 |

OTHER PUBLICATIONS

L. Galescu, et al., *Hierarchical Statistical Language Models: Experiments On In–Domain Adaptation,* University of Rochester, Proceedings of the 6$^{th}$ Int'l. Conf. on Spoken Language Processing ISLP 2000, (Oct. 20, 2000).

* cited by examiner

Primary Examiner—Richemond Dorvil
Assistant Examiner—Daniel A Nolan
(74) Attorney, Agent, or Firm—Akerman Senterfitt (57) ABSTRACT

The invention disclosed herein concerns a method of converting speech to text using a hierarchy of contextual models. The hierarchy of contextual models can be statistically smoothed into a language model. The method can include processing text with a plurality of contextual models. Each one of the plurality of contextual models can correspond to a node in a hierarchy of the plurality of contextual models. Also included can be identifying at least one of the contextual models relating to the text and processing subsequent user spoken utterances with the identified at least one contextual model.

40 Claims, 6 Drawing Sheets

CREATING A HIERARCHICAL TREE OF LANGUAGE MODELS FOR A DIALOG SYSTEM BASED ON PROMPT AND DIALOG CONTEXT

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition and dialog based systems, and more particularly, to the use of language models to convert speech to text.

2. Description of the Related Art

Speech recognition is the process by which an acoustic signal received by microphone is converted to a set of text words, numbers, or symbols by a computer. These recognized words may then be used in a variety of computer software applications for purposes such as document preparation, data entry, and command and control. Improvements to speech recognition systems provide an important way to enhance user productivity.

Speech recognition systems can model and classify acoustic signals to form acoustic models, which are representations of basic linguistic units referred to as phonemes. Upon receipt of the acoustic signal, the speech recognition system can analyze the acoustic signal, identify a series of acoustic models within the acoustic signal, and derive a list of potential word candidates for the given series of acoustic models.

Subsequently, the speech recognition system can contextually analyze the potential word candidates using a language model as a guide. Specifically, the language model can express restrictions imposed on the manner in which words can be combined to form sentences. The language model is typically a statistical model which can express the likelihood of a word appearing immediately adjacent to another word or words. The language model can be specified as a finite state network, where the permissible words following each word are explicitly listed, or can be implemented in a more sophisticated manner making use of a context sensitive grammar. Other exemplary language models can include, but are not limited to, n-gram models and maximum entropy language models, each of which is known in the art. A common example of a language model can be an n-gram model. In particular, the bigram and trigram models are exemplary n-gram models commonly used within the art.

Conventional language models can be derived from an analysis of a training corpus of text. A training corpus contains text which reflects the ordinary manner in which human beings speak. The training corpus can be processed to determine the statistical language models used by the speech recognition system for converting speech to text, also referred to as decoding speech. It should be appreciated that such methods are known in the art. For example, for a more thorough explanation of language models and methods of building language models, see *Statistical Methods for Speech Recognition* by Frederick Jelinek (The MIT Press ed., 1997).

Currently within the art, speech recognition systems can use a combination of language models to convert a user spoken utterance to text. Each language model can be used to determine a resulting text string. The resulting text strings from each language model can be statistically weighted to determine the most accurate or likely result. For example, speech recognition systems can incorporate a general or generic language model included within the system as well as a user specific language model derived from the first several dictation sessions or documents dictated by a user. Some speech recognition systems can continue to enhance an existing language model as a user dictates new documents or initiates new dictation sessions. Thus, in many conventional speech recognition systems, the language models can be continually updated.

Unfortunately, as the language models continue to grow, the importance of subject specific user dictation can be reduced. In particular, the effect of the more recent speech sessions can be diminished by the growing mass of data within the language model. Similarly, more recent user dictations, whether subject specific or not, also can be diminished in importance within the growing language model. This occurs primarily with regard to statistical language models where the statistical importance of one particular session or document which can be used to enhance the language model is lessened by an ever expanding data set. This statistical effect can be significant, for example, in the case where the user's speech patterns change as the user becomes more familiar and accustomed to interacting with the speech recognition or dialog based system. Notably, any enhancement of a language model resulting from a single session or document, which can produce a limited amount of data especially in light of the entire data set corresponding to the language model, will not likely alter the behavior of a statistical speech based system. In consequence, the language model may not accurately reflect a user's changing dictation style.

Similar problems can exist within the context of dialog based systems such as natural language understanding systems where a user can verbally respond to one or more system prompts. Though such systems can include one or more language models for processing user responses, the language models tailored to specific prompts can be built using an insufficient amount of data. Consequently, such language models can be too specific to accurately process received speech. Specifically, the language models can lack the ability to abstract out from the language model to process a more generalized user response.

SUMMARY OF THE INVENTION

The invention disclosed herein concerns a method of creating a hierarchy of contextual models and using those contextual models for converting speech to text. The method of the invention can be utilized within a speech recognition system and within a natural language understanding dialog based system. In particular, the invention can create a plurality of contextual models from different user speech sessions, documents, portions of documents, or user responses in the form of user spoken utterances. Those contextual models can be organized or clustered in a bottom up fashion into related pairs using a known distance metric. The related pairs of language models continually can be merged until a tree-like structure is constructed. The tree-like structure of contextual models, or hierarchy of contextual models, can expand outwardly from a single root node. The hierarchy of contextual models can be interpolated using a held out corpus of text using techniques known in the art such as deleted interpolation or the back-off approach. Notably, the invention is not so limited by the specific smoothing techniques disclosed herein. Rather, any suitable smoothing technique which is known in the art can be used.

After the hierarchy of contextual models is determined and smoothed, received user spoken utterances can be processed using the resulting hierarchy of contextual models. One or more contextual models within the hierarchy of contextual models can be identified which correspond to one or more received user spoken utterances. The identified contextual models can be used to process subsequent received user spoken utterances.

One aspect of the invention can include a method of converting speech to text using a hierarchy of contextual models. The hierarchy of contextual models can be statistically smoothed into a language model. The method can include (a) processing text with a plurality of contextual models wherein each one of the plurality of contextual models can correspond to a node in a hierarchy of the plurality of contextual models. The processing of text can be performed serially or in parallel. Also included in the method can be (b) identifying at least one of the contextual models relating to the received text and (c) processing subsequent user spoken utterances with the identified at least one contextual model.

At least one of the plurality of contextual models can correspond to a document or a portion of a document, a section of a document, at least one user response received in a particular dialog state in a dialog based system, or at least one user response received at a particular location within a particular transaction within a dialog based system. Still, the at least one of the plurality of contextual models can correspond to the syntax of a dialog based system prompt, a particular, known dialog based system prompt, or a received electronic mail message.

Another embodiment of the invention can include a method of creating a hierarchy of contextual models. In that case the method can include (a) measuring the distance between each of a plurality of contextual models using a distance metric. Notably, at least one of the plurality of contextual models can correspond to a portion of a document or a user response within a dialog based system. Also included can be (b) identifying two of the plurality of contextual models which can be closer in distance than other ones of the plurality of contextual models. Also included can be (c) merging the identified contextual models into a parent contextual model. The merging step (c) can include interpolating between the identified contextual models wherein the interpolation can result in a combination of the identified contextual models. Alternatively, the merging step (c) can include building a parent contextual model using data corresponding to the identified contextual models. Also included can be step (d) wherein steps (a), (b), and (c) can be repeated until a hierarchy of the plurality of contextual models can be created. In that case, the hierarchy can include a root node. Still, the hierarchy of the plurality of contextual models can be statistically smoothed resulting in a language model. For example, the hierarchy of contextual models can be interpolated using a held out corpus of text using techniques known in the art such as deleted interpolation, the back-off approach, or another suitable smoothing technique.

The plurality of contextual models, or the initial contextual models can be built from speech sessions, document templates, documents, and portions of documents such as paragraphs, or any part of a document that can be subdivided into one or more parts, such as a section of a document. In the case of a dialog based system such as a natural language understanding system, the initial contextual models can be built from one or more user responses to all or a subset of the various system prompts.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

The invention disclosed herein concerns a method of creating a hierarchy of contextual models and using those contextual models for converting speech to text. The method of the invention can be utilized within a speech recognition system and within a natural language understanding dialog based system. In particular, the invention can create a plurality of contextual models from different user speech sessions, documents, parts of documents, or responses in the form of user spoken utterances. Those contextual models can be organized or clustered in a bottom up fashion into related pairs using a known distance metric. Notably, the organization of contextual models into related pairs can be performed automatically and dynamically at runtime. The related pairs of contextual models can be merged to form a parent contextual model. The process can be repeated until a hierarchy of contextual models emerges resembling a tree-structure. The hierarchy can have a single root node from which other nodes extend. Notably, each node of the hierarchy of contextual models can correspond to a contextual model. It should be appreciated that the term "contextual model" as used herein can refer to a language model built from training data obtained from a single document, a portion of a document, or in the case of a natural language understanding (NLU) system, one or more user spoken utterances or responses.

The resulting hierarchy of contextual models can be interpolated using a held out corpus of text using techniques known in the art such as deleted interpolation or the back-off approach. Notably, the invention is not so limited by the specific smoothing techniques disclosed herein. Rather, any suitable smoothing technique which is known in the art can be used.

After the hierarchy of contextual models is determined, received user spoken utterances can be processed using the resulting hierarchy of contextual models. In particular, a particular contextual model within the hierarchy of contextual models can be identified which corresponds to, or most accurately reflects, one or more received user spoken utterances. For example, the invention can process a received user spoken utterance with the hierarchy of contextual models and identify the contextual model yielding resulting text having the highest confidence score. The invention can operate on the hypothesis that subsequent user spoken utterances can have a subject matter similar to the subject matter of the previously received user spoken utterance or utterances used to identify the corresponding contextual model. Thus, subsequent user spoken utterances can be processed with the identified contextual model to achieve increased speech recognition system performance.

Notably, the resulting hierarchy of contextual models and the resulting smoothed language model can allow the processing of subsequent user spoken utterances to be more generalized. This can be especially beneficial as applied to an NLU system where "under-trained" language models can adversely affect system performance. Specifically, the smoothed hierarchy of contextual models can be traversed toward the root node such that the contextual models become more generalized, but still context sensitive, or towards the leaves where the contextual models become more specific, but still context sensitive.

Figure 1:
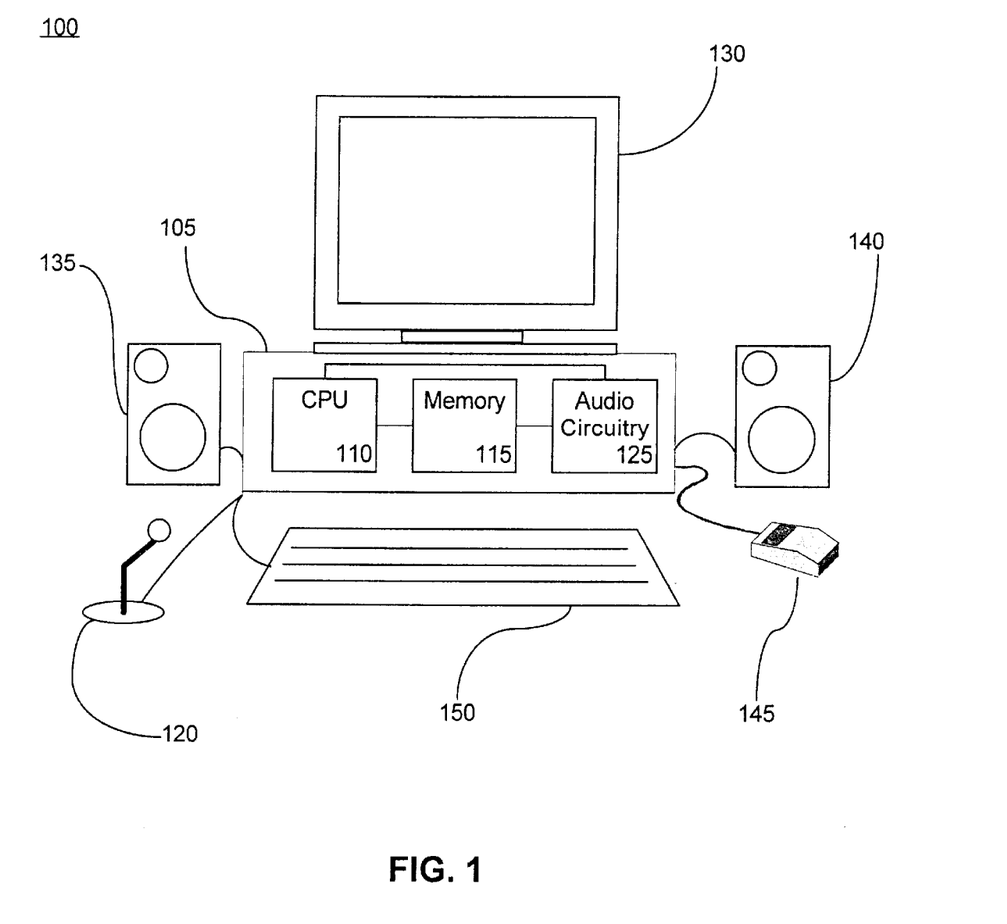
FIG. 1 is a schematic diagram of an exemplary computer system on which the invention can be used.

FIG. 1 depicts a typical computer system 100 for use in conjunction with the present invention. The system can include a computer 105 including a central processing unit 110 (CPU), one or more memory devices 115, and associated circuitry. The memory devices 115 can be comprised of an electronic random access memory and a bulk data storage medium. The system also can include a microphone 120 operatively connected to the computer system through suitable interface circuitry 125, and an optional user interface display unit 130 such as a video data terminal operatively connected thereto. The CPU can be comprised of any suitable microprocessor or other electronic processing unit, as is well known to those skilled in the art. Speakers 135 and 140, as well as an interface device, such as mouse 145, and keyboard 150, can be provided with the system, but are not necessary for operation of the invention as described herein. The various hardware requirements for the computer system as described herein can generally be satisfied by any one of many commercially available high speed computers.

Figure 2:
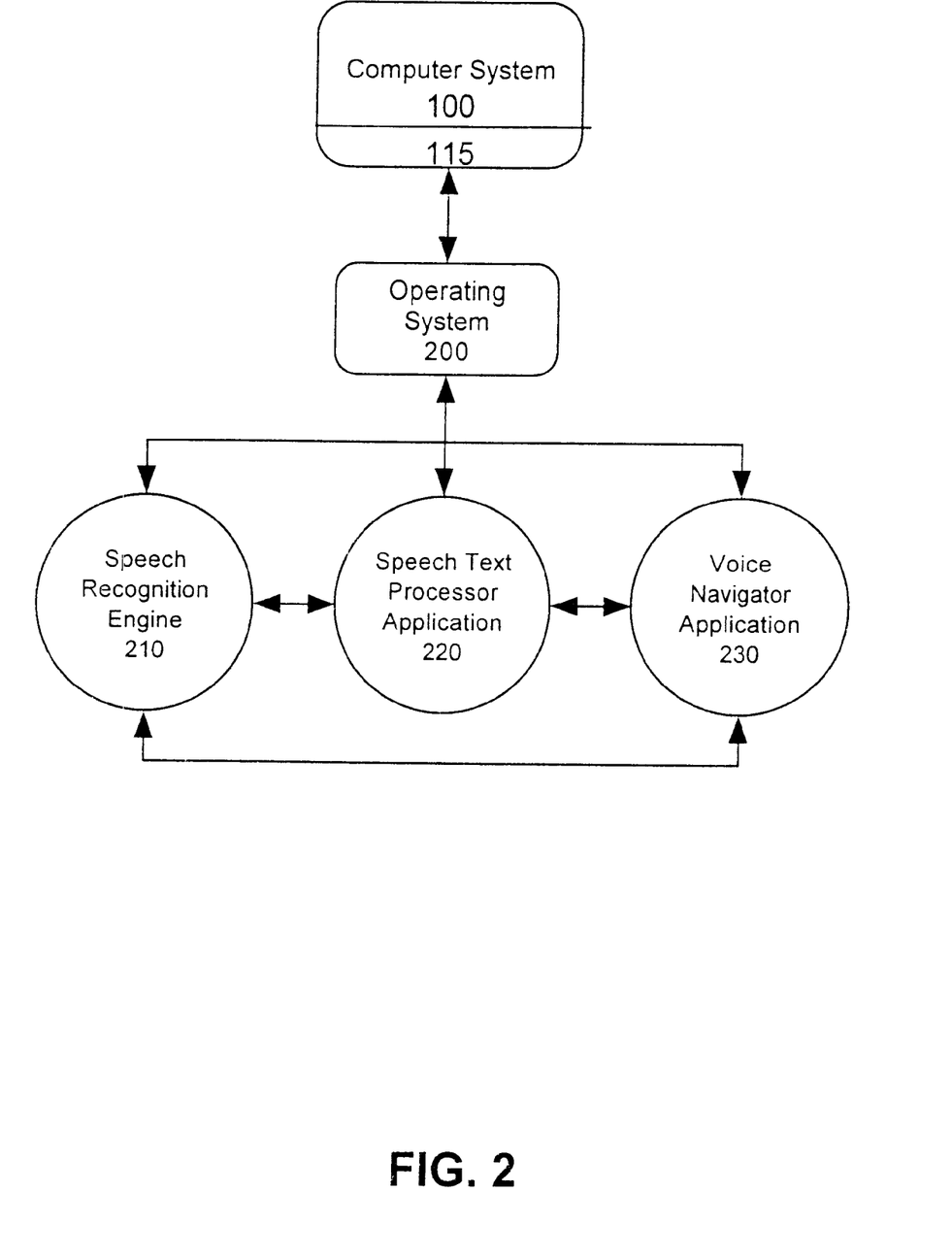
FIG. 2 is a schematic diagram depicting an exemplary architecture for speech recognition.

FIG. 2 is a schematic diagram illustrating a typical architecture for a speech recognition system in computer system 100. As shown in FIG. 2, within the memory 115 of computer system 100 can be an operating system 200 and a speech recognition engine 210. Also included can be a speech text processor application 220 and a voice navigator application 230. The invention, however, is not limited in this regard and the speech recognition engine 210 can be used with any other application program which is to be voice enabled. In FIG. 2, the speech recognition engine 210, speech text processor application 220, and the voice navigator application 230 are shown as separate application programs. It should be noted however that the invention is not limited in this regard, and these various application programs can be implemented as a single, more complex application program. For example the speech recognition engine 210 can be combined with the speech text processor application 220 or with any other application which is to be voice enabled. Also, if no other speech controlled application programs are to be operated in conjunction with the speech text processor application 220 and speech recognition engine 210, the system can be modified to operate without the voice navigator application 230. The voice navigator application 230 primarily helps coordinate the operation of the speech recognition engine 210.

The aforementioned components can be realized in a centralized fashion within the computer system 100. Alternatively, the aforementioned components can be realized in a distributed fashion where different elements are spread across several interconnected computer systems. In any case, the components can be realized in hardware, software, or a combination of hardware and software. Any kind of computer system, or other apparatus adapted for carrying out the methods described herein is suited. The system as disclosed herein can be implemented by a programmer, using commercially available development tools for the particular operating system used.

Computer program means or computer program in the present context means any expression, in any language, code or notation, of a set of instructions intended to cause a system having an information processing capability to perform a particular function either directly or after either or both of the following a) conversion to another language, code, or notation; b) reproduction in a different material form.

In operation, audio signals representative of sound received in microphone 120 can be processed within computer 100 using conventional computer audio circuitry so as to be made available to the operating system 200 in digitized form. Alternatively, audio signals can be received via a computer communications network from another computer system in analog or digital format, or from another transducive device such as a telephone. The audio signals received by the computer system 100 are conventionally provided to the speech recognition engine 210 via the computer operating system 200 in order to perform speech recognition functions. As in conventional speech recognition systems, the audio signals can be processed by the speech recognition engine 210 to identify words spoken by a user into microphone 120.

Figure 3A:
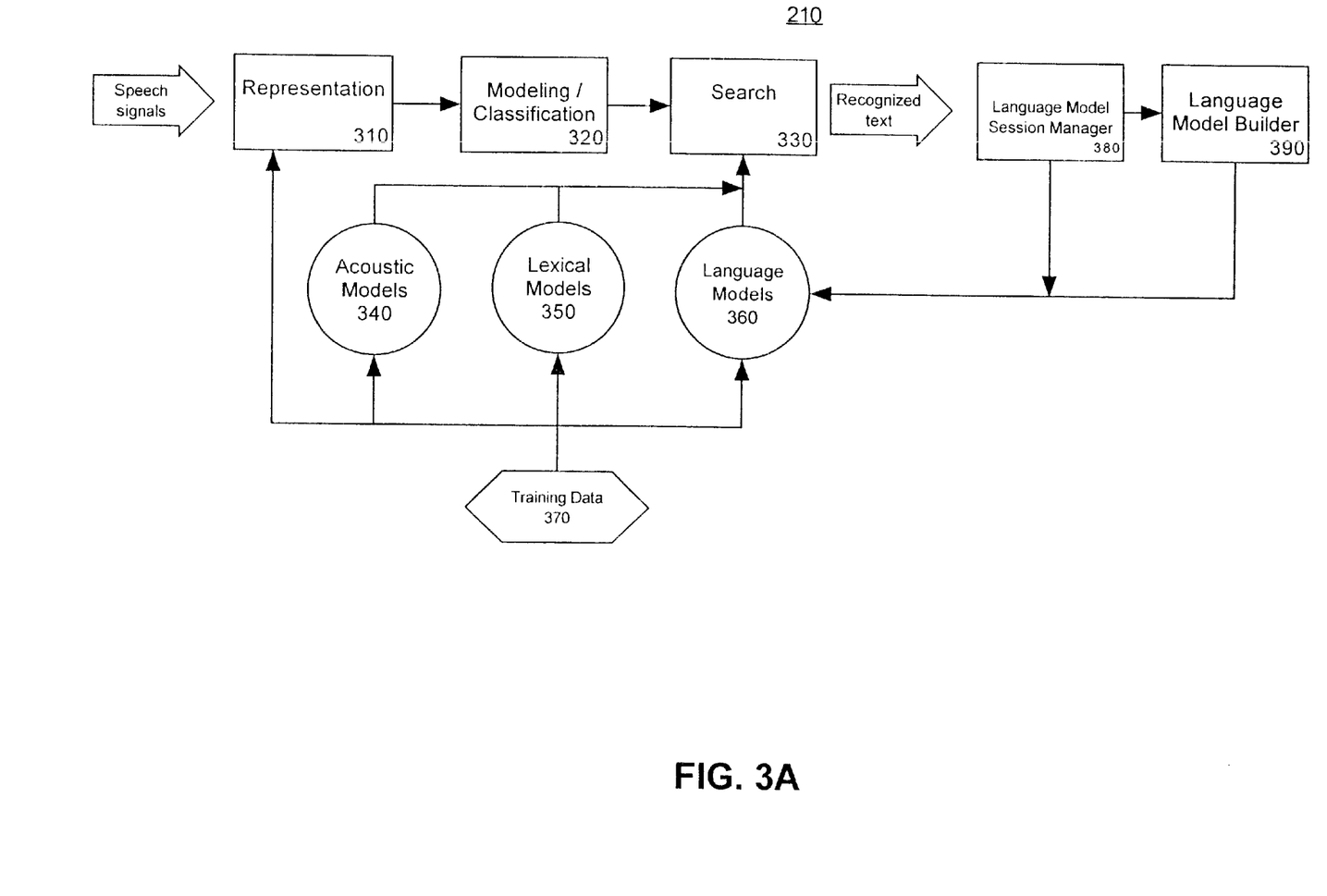
FIGS. 3A and 3B are schematic diagrams showing typical components which can comprise a speech recognition engine.

FIG. 3A is a block diagram showing typical components which can comprise speech recognition engine 210 As shown in FIG. 3 the speech recognition engine 210 receives a digitized speech signal from the operating system. The system is subsequently transformed in representation block 310 into a useful set of data by sampling the signal at some fixed rate, typically every 10–20 msec. The representation block produces a new representation of the audio signal which can then be used in subsequent stages of the voice recognition process to determine the probability that the portion of the waveform just analyzed corresponds to a particular phonetic event. This process is intended to emphasize perceptually important speaker independent features of the speech signals received from the operating system. In modeling/classification block 320, algorithms process the speech signals further to adapt speaker-independent acoustic models to those of the current speaker. Finally, in search block 330, search algorithms are used to guide the search engine to the most likely words corresponding to the speech signal. The search process in search block 330 occurs with the help of acoustic models 340, lexical models 350, and language models 360. The speech recognition engine 210 also can include training data 370.

Language models 360 can be used to help restrict the number of possible words corresponding to a speech signal when a word is used together with other words in a sequence. The language model can be specified as a finite state network, where the permissible words following each word are explicitly listed, or can be implemented in a more sophisticated manner making use of a context sensitive grammar. Other exemplary language models can include, but are not limited to, n-gram models and maximum entropy language models, each of which is known in the art. In any case, it is often desirable to update the content of the language model with information concerning speech patterns likely to be encountered in the case of a specific user. The search process determines the word candidate having the highest confidence score as text output.

A confidence score reflects the likelihood that a particular word candidate accurately reflects a corresponding user spoken utterance. The confidence score can be a value derived from acoustic models, lexical models, and language models. For example, the confidence score can take into account the likelihood that a particular word candidate represents a user spoken utterance as determined using an acoustic model, in addition to, the probability that the particular word candidate can be located next to another word or group of words as determined using a language model.

Recognized text can be provided to a Language Model Session Manager (LMSM) 380. Based on the probability that the resulting text accurately reflects the received user spoken utterance, the LMSM 380 can determine a more appropriate contextual model for processing subsequently received user spoken utterances. More specifically, the LMSM 380 can identify a contextual model which can be used to process text wherein the resulting text can have the highest probability of reflecting the received user spoken utterance. Thus, the LMSM 380 can select a suitable contextual model for use in processing subsequently received speech. As shown, the LMSM 380 can provide a feedback path to the speech recognition system.

The LMSM 380 further can recognize sections of documents. For example, the LMSM 380 can determine the section of a document by the location of a cursor within the document. The LMSM 380 can be programmed with one or more templates wherein the templates can contain indications of different document sections, such as the introduction, background, or other definable section of a document. The sections can be user defined sections and can be subject specific. For example, the sections can be subparts of a document which may or may not be a subject specific test including a true or false section, a short answer section, or a multiple choice section. Notably, conventional word processing programs can provide sectioning of documents.

The LMSM 380 further can be programmed to determine when to command the Language Model Builder (LMB) 390 to build a new contextual model and rebuild the hierarchy of contextual models. The LMB 390 can dynamically build a new initial contextual model as well as rebuild the hierarchy of contextual models. For example, if initial contextual models are to be built from documents, the LMSM 380 can determine when a document or portion of a document is complete such that a new contextual model can be built and the hierarchy of contextual models can be rebuilt. More specifically, upon the user closing a document or otherwise informing the speech recognition system that the user has finished dictation of a document or a portion of a document, the LMSM 380 can instruct the LMB 390 to begin to rebuild the hierarchy of contextual models. The LMSM 380 can be programmed with various templates and document sections, as used in conventional word processing programs, such that completion of any of the aforementioned can result in the hierarchy of contextual models being rebuilt. For example, the LMSM 380 can dynamically build a contextual model corresponding to a document section and rebuild the hierarchy of contextual models when the cursor of a text editing program leaves that section of the document. Similarly, if the contextual models are built from portions of documents such as paragraphs, the completion of a paragraph, for example, a hard return command, can signal the LMSM 380 to instruct the LMB 390 to build a new contextual model based off of the text included within the most recent paragraph. The LMB 390 can then rebuild the hierarchy of contextual models. As previously mentioned, the initial contextual models can be built from templates of documents, documents, sections of documents, or portions of documents.

Figure 3B:
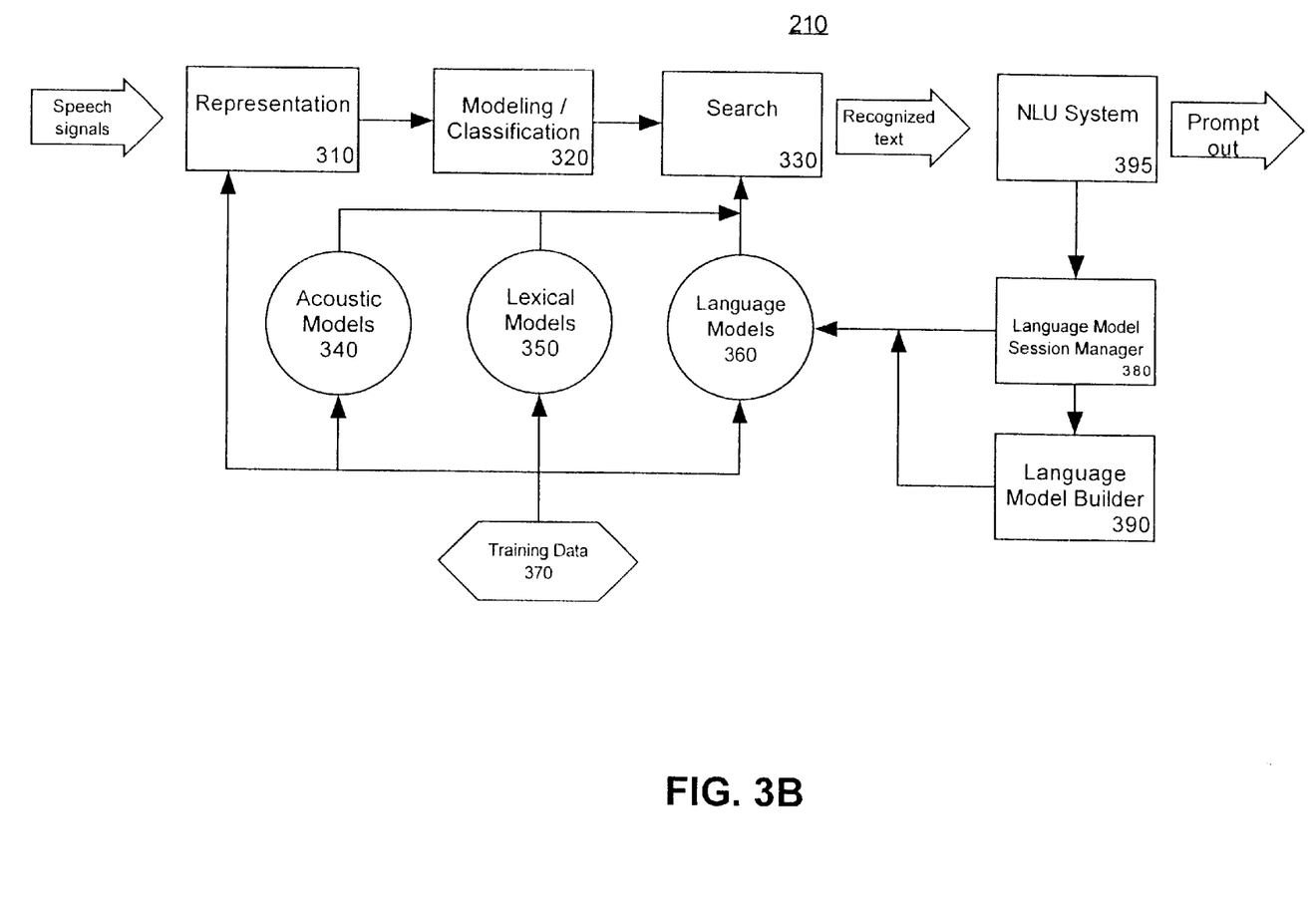

FIG. 3B is a block diagram showing typical components which can comprise speech recognition engine 210 similar to the block diagram of FIG. 3A. FIG. 3B, however, can include an NLU system. Notably, an NLU system can enable a computers to understand and extract information from human written or spoken language. Such systems can function in a complimentary manner with a variety of other computer applications where there exists a need to understand human language. NLU systems can extract relevant information contained within text and then supply this information to another application program.

The NLU system can communicate with the LMSM 380 to provide the LMSM 380 with information relating to the user spoken utterance as a response to a dialog based system. Such information can include the particular transaction type in which the user is engaged, the location of the user within the transaction, the particular dialog based system prompt, and the syntax of the prompt. For example, the NLU system 395 can provide the LMSM with information that the user spoken utterance was responsive to a prompt asking for an account name in the context of a withdrawal transaction in a financial system. Moreover, the NLU system can inform the LMSM that the expected response was a number, a text sentence having a particular syntax or concerning a particular subject, or a yes or no type prompt.

For example, the initial contextual models can be built from user responses relating to the state of a given dialog, the subject of a given transaction, the location of a user within a particular transaction, user responses to a particular, known dialog prompt, or the syntax of the dialog prompt to which the user is responding. The state of a given dialog generally can refer to each of the aforementioned factors.

The subject of a given transaction can refer to the action or command which the user is requesting. For example, in a financial management system, the transactions can include withdrawals, transfers, deposits, etc. In the context of a travel system, the transactions can include booking a flight, renting a car, etc. The transactions can be application specific and based upon the system to which the NLU system provides an interface. Thus, contextual models can be built according to each identifiable subject within a dialog based system.

The location within a transaction can provide contextual information regarding a user response. Specifically, any given transaction can require one or more user specified parameters. Thus, based on the parameters received, in addition to the particular type of transaction initiated, the speech recognition system can build a contextual model without knowing the exact dialog based system prompt to which the user has responded based only upon information concerning the user's location within a given transaction.

Contextual models can be built from user responses to particular, known dialog based system prompts. Additionally, contextual models can be built from user responses to questions having a particular syntax. For example, user responses to "yes" or "no" system prompts can be grouped to build a language model. Similarly, user responses to "who", "what", "where", "when", "why", or "how" questions can be grouped, as well as user responses to multiple choice or list type prompts.

Statistical smoothing can alleviate problems with regard to under-training or using a small amount of training data. Additionally, the hierarchical structure allows the speech recognition system to process user spoken utterances with increasingly generalized models which remain context sensitive. Therefore, if a user response does not conform to the data previously collected, a more generalized contextual model can be used to process the user response.

Thus, the LMB 390 dynamically can build contextual models, for example the initial contextual models, wherein each contextual model can be built from a grouping of one or more user responses. Also, the LMB 390 can dynamically rebuild the hierarchy of contextual models responsive to receiving a user spoken utterance given in response to a dialog prompt. The system of FIG. 3B further differs from that of FIG. 3A in that the NLU system 395 can generate a dialog prompt which can be played via a recording or using text to speech technology.

Figure 4:
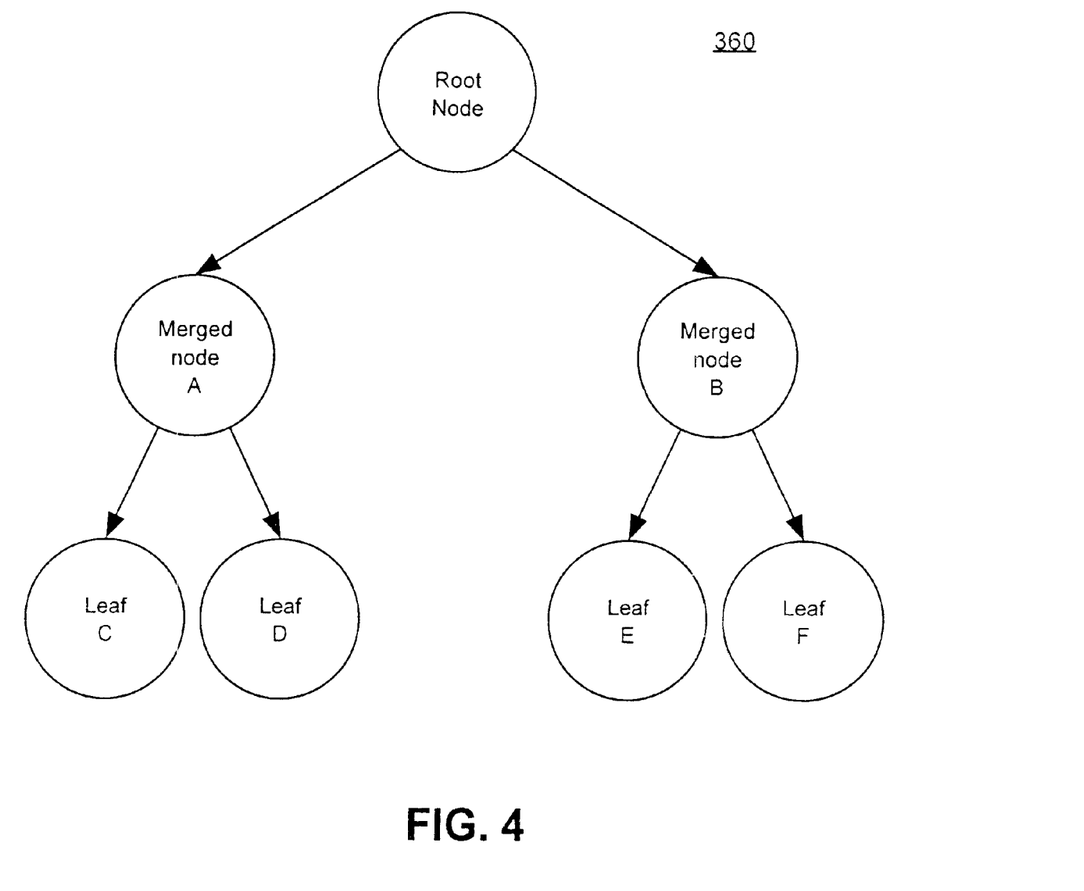
FIG. 4 block diagram illustrating an exemplary hierarchy of contextual models.

FIG. 4 depicts the exemplary hierarchy of contextual models 360 of FIG. 3. The language model 360 is depicted as a tree structure having multiple nodes A, B, C, D, E, and F extending below the root node. Each node can correspond to a contextual model. Leaf node pair C and D and leaf node pair E and F, also referred to as terminal nodes, can be identified as related contextual model pairs using a known distance metric. For example, such a metric can include, but is not limited to, the Kullback-Liebler distance, relative entropy, discrimination, or divergence. In any case, the bottom level of contextual models can be grouped into pairs using the known metric. This process, known as bottom up clustering, can be continued until a root node is determined.

In another embodiment of the invention, the contextual models can be grouped by the subject matter of the dictation session from which the contextual model was derived. For example, the speech recognition system can use word search algorithms and natural language technology to classify each individual contextual model (node) according to a predetermined subject. The contextual model can be tagged accordingly such that not only can related contextual models be paired, but the speech recognition system can group only related contextual models which are classified under a particular subject. Alternatively, the user can define a particular subject classification. In that case, the user can enter a series of keywords which the speech recognition system can use to classify contextual models. The speech recognition system also can allow the user to override the classification of a contextual model.

The grouped pairs of contextual models can be merged into a parent contextual model. For example, node A can be a parent which is derived from its merged children, leaf nodes C and D. Similarly, node B can be a parent which can be derived from its children, leaf nodes E and F. The merger of two child nodes to form a parent can be accomplished using a variety of methods. One such method can be an interpolation method. For example, potential word candidates can be processed using each child node contextual model. Subsequently, the two possible resulting phrases can be compared wherein the most probable result can be selected. Notably, the probability associated with each contextual model result can be multiplied by a weighted constant. In that case, the constant applied to leaf C for example and the constant applied to leaf D can have a sum of 1. Another method of merging two child nodes to form a parent can include using the data corresponding to each child node to build a new contextual model using known methods of building contextual models. Thus, the data used to build the parent contextual model at a node can be the composite data of the parent's two children.

Regardless of the particular method used to merge two nodes, at each level of the hierarchy of contextual models, the grouping of paired nodes and the merger of those nodes into a parent node can continue until a root node is reached. The parent nodes A and B can include shared characteristics of their children. Similarly, the root node can include shared characteristics of its children, the contextual models corresponding to nodes A and B. Thus, the hierarchy of contextual models provides an assortment of contextual models, each incorporating a mix of user dependent speaking styles incorporated therein. Notably, in the case where parent contextual models are built using composite data, the resulting hierarchy of contextual models can be referred to as a single hierarchical language model. Accordingly, the lowest contextual models are the most specific models. If a particular contextual model does not yield a satisfactory confidence score, the tree can be ascended to a more generalized contextual model.

Figure 5:
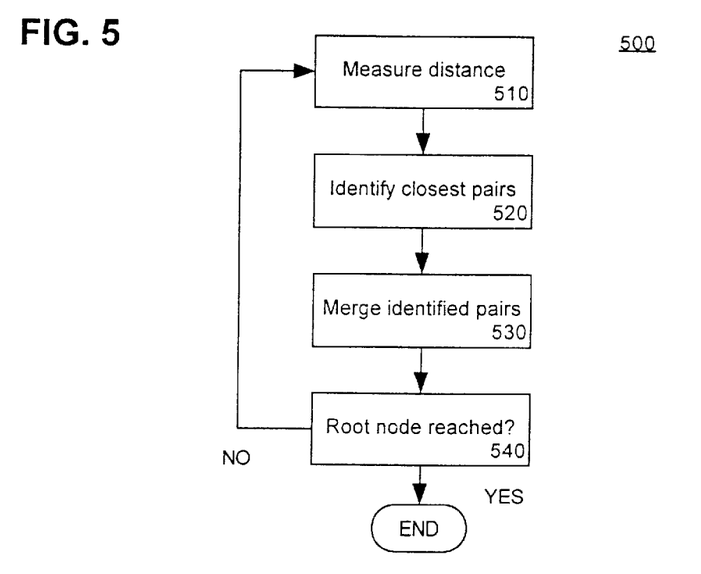
FIG. 5 is a flow chart illustrating an exemplary method of the invention.

FIG. 5 is a flow chart 500 illustrating an exemplary method of creating hierarchical contextual models as performed using the computer system of FIG. 1 and the speech recognition engine of FIG. 2. The method begins in a state where the speech recognition system has accumulated a plurality of contextual models such as the contextual models associated with the leaf nodes C, D, E, and F, the bottom row of the contextual model hierarchy to be created. These contextual models, the starting contextual models, can differ depending on use. For example, for general dictation, the speech recognition system can create a new contextual model for each previously dictated session, document, portion of a document, or section of a document corresponding to a particular user.

In illustration, the speech recognition system can generate a contextual model for patent applications. Still, the speech recognition system can generate a contextual model for each part of a patent application. For example, the claims of various patent applications can contain similar features, as can other parts of a patent application such as the abstract, detailed description, as well as the summary of the invention. Thus, a contextual model can be built for each part of a document such as a patent application. Another embodiment can include building a contextual model for sub-parts. For example, a contextual model can be built for independent claims and another for dependent claims. Notably, any identifiable portion of a document can be used to build a corresponding contextual model. Conventional word processors can subdivide documents into one or more sections. These subdivisions, for example, also can be used to generate a contextual model for each identifiable subdivision of a document.

For contextual models used in a dialog system, each starting contextual model can correspond to the set of sentences which are responses to each prompt issued by the dialog system. In any event, the starting contextual models, or bottom row of the hierarchy, can serve as the foundation for any interpolation between contextual models or any subsequent building of new parent contextual models, both of which can comprise the resulting contextual model hierarchy.

The speech recognition system can include a user adjustable parameter for instructing the speech recognition system to store the contextual models of the last n dictation sessions, documents, or responses corresponding to a particular user. Alternatively, the speech recognition system can store the last n contextual models corresponding to a particular subject classification of contextual model. For example, the last n business related contextual models can be stored, the last n personal letter contextual models can be stored, etc. Further, the parameter can be specified on a per user basis, as well as on a per subject classification basis. Thus, user A can determine an overall value of n, in addition to a unique value of n for each subject classification. User B also can set an overall value of n, in addition to different values of n for each subject classification. Moreover, the values of n set by user B can be wholly independent of the values of n set by user A. Thereby allowing the system to generalize as needed.

The method 500 of FIG. 5 can be performed on a per user basis. Further, if the computer system of FIG. 1 possesses adequate processing power, the method 500 can be performed upon initiation of each new user dictation session, document, or user response. Thus, the hierarchy of contextual models corresponding to a particular user constantly can be updated. Alternatively, the method 500 can be performed automatically by the speech recognition system on a periodic bases or in an offline manner responsive to a user request.

In any event, in step 510, the speech recognition system can use a distance metric to determine how closely related each contextual model is to every other contextual model corresponding to a particular user. As mentioned, the speech recognition system can use the Kullback-Liebler distance, as well as the subject classification of each contextual model for the relatedness or distance determination. After completion of step 510, the method can continue to step 520.

In step 520, the speech recognition system can identify the pair of contextual models having the smallest distance. After completion of step 520, the method can proceed to step 530 where the contextual models can be merged. As mentioned, the contextual models can be merged by interpolation or by using the data of each child contextual model to build a new parent contextual model. If the contextual models are being rebuilt at each merged parent, the root node can correspond to using a single language model. In that case, the nodes of the hierarchical contextual model can be smoothed using data which can be held out or excluded from the initial derivation of the contextual model. The excluded data can then be used to perform statistical smoothing of the resulting hierarchical contextual model. Thus, the contextual model can be the interpolation of all contextual models from a leaf node to the root node. Regardless, after completion of step 530, the method can continue to step 540.

In step 540, the speech recognition system can determine whether a single root node has been determined. More specifically, the speech recognition system can determine whether the hierarchy of contextual models terminates in a single node. If so, the method can end. If not, however, the method can loop back to step 510 to repeat. It should be appreciated that the method 500 can repeat as needed wherein each iteration through the method creates another level to the hierarchy of contextual models in an ascending fashion progressing toward a single root node.

Figure 6:
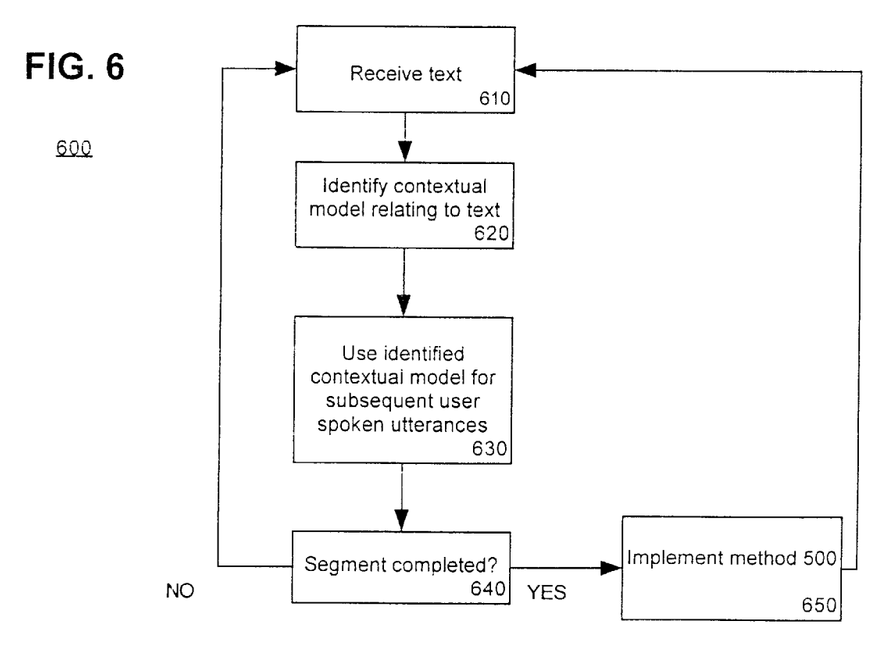
FIG. 6 is a flow chart illustrating an exemplary method of the invention.

FIG. 6 is a flow chart 600 depicting an exemplary method of converting speech to text using the hierarchy of contextual models of FIG. 4. In particular the speech recognition system can select a suitable contextual model to process subsequent user spoken utterances based upon a received user spoken utterance. If the computer system has sufficient processing power such that the system can convert speech to text in real time without unreasonable delay, the contextual model determination can be performed for each user utterance or sentence received by the speech recognition system. For example, after each detectable pause in a received user spoken utterance, the speech recognition system can perform method 600.

Alternatively, the determination can be performed at the beginning of a dictation session, periodically throughout the speech session, or responsive to a user command to perform the determination. For example, the speech recognition system can perform the determination automatically after the user has dictated for a predetermined amount of time or responsive to the confidence score falling below a predetermined threshold. In the case of a user request, the user can request the determination be made when the user changes to a different dictation style or subject, for example, business to personal correspondence.

The method 600 can begin at step 610 where the speech recognition system receives a text input. The text input can be derived from a speech recognition system or can be text within an existing document. Notably, the text can be a received electronic mail message. After completion of step 610, the method can continue to step 620. In step 620, the speech recognition system can process the received text using the hierarchy of contextual models. For example, the text can be processed with each of the contextual models contained within the hierarchy of contextual models. The contextual model which yields the text having the highest confidence score can be identified as the correct or most suitable contextual model for use in converting subsequent user spoken utterances to text. The processing can proceed in a serial or a parallel fashion.

For example, in a dialog based system, though a "yes" or "no" response from a user can be expected in response to a particular dialog prompt, the user can respond as follows: "yes, however I would like X". In this case, the user has responded and provided additional information. Thus, though a dialog based system can include a contextual model corresponding to the prompt to which the user has responded, the user's response can more closely resemble an expected response to another system prompt. Notably, an expected response which is not limited to a "yes" or "no" answer. Regardless, the text derived from the speech recognition system can be processed with the hierarchy of contextual models. The contextual model which yields text having the highest confidence score can be identified. Notably, because the user response varied from the type of user response expected by the NLU system, the identified contextual model can be different from the contextual model ordinarily associated with processing user responses from the particular dialog prompt to which the user has responded. The identified contextual model further can differ from the contextual model used by the speech recognition system to convert the user spoken utterance to text.

In another embodiment of the invention, a contextual model corresponding to an identifiable document section can be identified. For example, if a user is dictating a document and the speech recognition system determines that the user's cursor is located within a particular section of the document, the speech recognition system can identify the contextual model corresponding to that document section. The identified contextual model can be used, at least initially, to process subsequently received user spoken utterances while the user's cursor is located within the corresponding document section. Still, the user can specify the document section to the speech recognition system in another method such via a speech or pointer command. Notably, other methods of determining a contextual model can be incorporated as well. For example, based on unsatisfactory confidence scores, the speech recognition system can discontinue use of the identified contextual model in favor of another contextual model.

It should be appreciated that the speech recognition system can identify one or more contextual models producing text with a confidence score above a predetermined minimum threshold value. In that case, the speech recognition system can use each identified contextual model wherein the results using each model can be weighted using probability coefficients. For example, the coefficient can be directly related to confidence scores of the resulting text. Alternatively, the speech recognition system can extrapolate between the identified contextual models. Still, the contextual model yielding the text having the highest confidence score can be selected. After completion of step 620, the method can continue to step 630.

In step 630, the identified contextual model can be used to process subsequent user spoken utterances in the speech recognition system. The speech recognition system can proceed on the assumption that subsequent user spoken utterances occurring within a particular amount of time of the contextual model determination are likely to have a similar syntax and vocabulary or relate to similar subject matter as the text used to make the determination. Thus, in addition to selecting a contextual model based upon subject matter, in relation to a dictation system, the method can select a contextual model from the hierarchy of contextual models according to the dialog state in an NLU system.

Another embodiment of the invention can include selecting a contextual model based upon a received electronic mail message. For example, a received electronic mail message can be processed to determine an appropriate contextual model corresponding to that electronic mail. The identified contextual model can be used to convert subsequent user spoken utterances to text. Notably, the contextual model can be used to convert user spoken utterances during a dictation session wherein the user can be replying to the received electronic mail message. Thus, the received electronic mail can be processed to determine a contextual model which corresponds to the subject of the received electronic mail. That contextual model can be used to process the user's dictated response to that electronic mail. Further, the speech recognition system can process the different portions of the received electronic mail message including the subject of the message. In another embodiment of the invention, the subject can be accorded additional weight in determining a suitable contextual model. After completion of step 630, the method can proceed to step 640.

In step 640, if the segment has been completed, the method can continue to step 650. If not, the method can continue to step 610 to collect more text. Notably, the segment can correspond to the unit of text used to build the initial contextual models which serve as the foundation for the hierarchy of contextual models. For example, the segment can correspond to a document, a paragraph, a sentence, a portion of the document, or a user response to a given dialog prompt. Once the predetermined quantity of text has been collected, the segment is complete. Alternatively, the user can notify the speech recognition system of the beginning and end of the user spoken utterance to be converted to text. In any case, the amount of text used to build an initial contextual model can be collected thereby completing a segment.

If the segment has been completed, in step 650, the method can dynamically build a new contextual model corresponding to the completed segment. Additionally, the method can execute the method 500 for dynamically rebuilding the hierarchy of contextual models. After completion of step 650, the method can repeat.

What is claimed is:

1. A method of creating a hierarchy of contextual models, said method comprising:
   (a) measuring the distance between each of a plurality of contextual models using a distance metric, wherein at least one of said plurality of contextual models corresponds to at least a portion of a document or a user response within a dialog based system;
   (b) identifying two of said plurality of contextual models, said identified contextual models being closer in distance than other ones of said plurality of contextual models;
   (c) merging said identified contextual models into a parent contextual model;
   (d) repeating said steps (a), (b), and (c) until a hierarchy of said plurality of contextual models is created, said hierarchy having a root node; and
   (e) statistically smoothing said hierarchy of said plurality of contextual models resulting in a language model.

2. The method of claim 1, said merging step (c) further comprising:
   interpolating between said identified contextual models, said interpolation resulting in a combination of said identified contextual models.

3. The method of claim 1, wherein at least one of said plurality of contextual models corresponds to a section of a document.

4. The method of claim 1, wherein at least one of said plurality of contextual models corresponds to at least one user response received in a particular dialog state in the dialog based system.

5. The method of claim 1, wherein at least one of said plurality of contextual models corresponds to at least one user response received at a particular location within a particular transaction within the dialog based system.

6. The method of claim 1, wherein at least one of said plurality of contextual models corresponds to a syntax of a prompt in the dialog based system.

7. The method of claim 1, wherein at least one of said plurality of contextual models corresponds to a particular and known dialog based system prompt.

8. The method of claim 1, wherein at least one of said plurality of contextual models corresponds to a received electronic mail message.

9. A method of creating a hierarchy of contextual models, said method comprising:
   (a) measuring the distance between each of a plurality of contextual models using a distance metric, wherein at least one of said plurality of contextual models corresponds to at least a portion of a document or a user response within a dialog based system;
   (b) identifying two of said plurality of contextual models, said identified contextual models being closer in distance than other ones of said plurality of contextual models;
   merging said identified contextual models into a parent contextual model by building a parent contextual model using data corresponding to said identified contextual models;
   (d) repeating said steps (a), (b), and (c) until a hierarchy of said plurality of contextual models is created, said hierarchy having a root node; and (e) statistically smoothing said hierarchy of said plurality of contextual models resulting in a language model.

10. A machine readable storage, having stored thereon a computer program having a plurality of code sections executable by a machine for causing the machine to perform the steps of:
  (a) measuring the distance between each of a plurality of contextual models using a distance metric, wherein at least one of said plurality of contextual models corresponds to at least a portion of a document or a user response within a dialog based system;
  (b) identifying two of said plurality of contextual models, said identified contextual models being closer in distance than other ones of said plurality of contextual models;
  (c) merging said identified contextual models into a parent contextual model;
  (d) repeating said steps (a), (b), and (c) until a hierarchy of said plurality of contextual models is created, said hierarchy having a root node; and
  (e) statistically smoothing said hierarchy of said plurality of contextual models resulting in a language model.

11. The machine readable storage of claim 10, said merging step (c) further comprising:
  interpolating between said identified contextual models, said interpolation resulting in a combination of said identified contextual models.

12. The machine readable storage of claim 10, wherein at least one of said plurality of contextual models corresponds to a section of a document.

13. The machine readable storage of claim 10, wherein at least one of said plurality of contextual models corresponds to at least one user response received in a particular dialog state in the dialog based system.

14. The machine readable storage of claim 10, wherein at least one of said plurality of contextual models corresponds to at least one user response received at a particular location within a particular transaction within the dialog based system.

15. The machine readable storage of claim 10, wherein at least one of said plurality of contextual models corresponds to a syntax of a prompt in the dialog based system.

16. The machine readable storage of claim 10, wherein at least one of said plurality of contextual models corresponds to a particular and known dialog based system prompt.

17. The machine readable storage of claim 10, wherein at least one of said plurality of contextual models corresponds to a received electronic mail message.

18. A machine readable storage, having stored thereon a computer program having a plurality of code sections executable by a machine for causing the machine to perform the steps of:
  (a) measuring the distance between each of a plurality of contextual models using a distance metric wherein at least one of said plurality of contextual models corresponds to at least a portion of a document or a user response within a dialog based system;
  (b) identifying two of said plurality of contextual models, said identified contextual models being closer in distance than other ones of said plurality of contextual models;
  (c) merging said identified contextual models into a parent contextual model by building a parent contextual model using data corresponding to said identified contextual models;
  (d) repeating said steps (a), (b), and (c) until a hierarchy of said plurality of contextual models is created, said hierarchy having a root node; and
  (e) statistically smoothing said hierarchy of said plurality of contextual models resulting in a language model.

19. A method of creating a hierarchical tree of language models comprising:
  (a) creating a language model at the leaves of a tree, wherein each leaf corresponds to a different non-overlapping partition of user responses to prompts in a dialog system;
  (b) identifying at least two closest child language models for leaves in the tree;
  (c) merging said identified language models into a parent language model by using data corresponding to each child language mode; and
  (d) repeating steps (b) and (c) until the hierarchical tree is formed, whereby a root of the hierarchical tree is built using all available training data.

20. The method of claim 19, wherein language models at the leaves of the tree are partitioned based upon dialog context.

21. The method of claim 20, wherein the dialog context is determined by a transaction the dialog system is in when a user response is collected.

22. The method of claim 20, wherein the dialog context is determined by a type of information for which the dialog system has asked when a user response is collected.

23. The method of claim 20, wherein the dialog context is determined by a type of question the dialog system has asked when a user response is collected.

24. The method of claim 23, wherein the dialog system has asked a yes or no question.

25. The method of claim 23, wherein the dialog system has asked a multiple choice question.

26. The method of claim 23, wherein the dialog system has asked a which question.

27. The method of claim 23, wherein the dialog context is determined by a number of consecutive prompts given to a user for a current dialog context.

28. The method of claim 19, wherein the hierarchical tree is constructed a priori from collected training data prior to the dialog system, within which the hierarchical tree is to be used, is deployed.

29. The method of claim 19, further comprising:
  collecting data from users and adding the data to at least one of the non-overlapping partitions;
  creating additional leaf language models using the collected data; and
  rebuilding the hierarchical tree using the new leaves.

30. A machine readable storage, having stored thereon a computer program having a plurality of code sections executable by a machine for causing the machine to perform the steps of:
  (a) creating a language model at the leaves of a tree, wherein each leaf corresponds to a different non-overlapping partition of user responses to prompts in a dialog system;
  (b) identifying at least two closest child language models for leaves in the tree;
  (c) merging said identified language models into a parent language model by using data corresponding to each child language model; and
  (d) repeating steps (b) and (c) until the hierarchical tree is formed, whereby a root of the hierarchical tree is built using all available training data.

31. The machine readable storage of claim 30, wherein language models at the leaves of the tree are partitioned based upon dialog context.

32. The machine readable storage of claim 31, wherein the dialog context is determined by a transaction the dialog system is in when a user response is collected.

33. The machine readable storage of claim 31, wherein the dialog context is determined by a type of information for which the dialog system has asked when a user response is collected.

34. The machine readable storage of claim 31, wherein the dialog context is determined by a type of question the dialog system has asked when a user response is collected.

35. The machine readable storage of claim 34, wherein the dialog system has asked a yes or no question.

36. The machine readable storage of claim 34, wherein the dialog system has asked a multiple choice question.

37. The machine readable storage of claim 34, wherein the dialog system has asked a which question.

38. The machine readable storage of claim 34, wherein the dialog context is determined by a number of consecutive prompts given to a user for a current dialog context.

39. The machine readable storage of claim 30, wherein the hierarchical tree is constructed a priori from collected training data prior to the dialog system, within which the hierarchical tree is to be used, is deployed.

40. The machine readable storage of claim 30, further comprising:
    collecting data from users and adding the data to at least one of the non-overlapping partitions;
    creating additional leaf language models using the collected data; and
    rebuilding the hierarchical tree using the new leaves.

* * * * *